United States Patent [19]
Round et al.

[11] Patent Number: 5,720,251
[45] Date of Patent: Feb. 24, 1998

[54] ROTARY ENGINE AND METHOD OF OPERATION

[76] Inventors: George F. Round, 1116 Havendale Blvd., Burlington, Ontario, Canada, L7P 3E3; Viljo K. Valavaara, 3939 Lawrence Ave., E. Toronto, Ontario, Canada, M1E 1R9; Lixin Peng, 703-438 Niagara St., Windsor, Ontario, Canada, N9A 3S9

[21] Appl. No.: 633,825
[22] PCT Filed: Oct. 7, 1994
[86] PCT No.: PCT/CA94/00550
  § 371 Date: Apr. 3, 1996
  § 102(e) Date: Apr. 3, 1996
[87] PCT Pub. No.: WO95/10691
  PCT Pub. Date: Apr. 20, 1995

[30] Foreign Application Priority Data

Oct. 8, 1993 [CA] Canada ................... 2108108

[51] Int. Cl.$^6$ .................................. F02B 53/00
[52] U.S. Cl. .................. 123/246; 418/171; 123/209
[58] Field of Search .................. 123/209, 246; 418/171

[56] References Cited

U.S. PATENT DOCUMENTS

| | | | |
|---|---|---|---|
| 1,968,113 | 7/1934 | Weaver | 123/246 |
| 3,117,561 | 1/1964 | Bonavera | 123/246 |
| 3,957,021 | 5/1976 | Loyd | 123/209 |
| 3,976,036 | 8/1976 | Muroki et al. | 123/209 |
| 4,235,217 | 11/1980 | Cox | 418/171 |
| 4,932,850 | 6/1990 | Valavaara | 418/171 |
| 5,066,207 | 11/1991 | Valavaara | 418/171 |

FOREIGN PATENT DOCUMENTS

| | | | |
|---|---|---|---|
| 672398 | 9/1929 | France . | |
| 2177388 | 11/1973 | France . | |
| 414993 | 6/1925 | Germany | 123/246 |
| 396857 | 8/1933 | United Kingdom . | |
| 957531 | 5/1964 | United Kingdom | 123/246 |
| WO94/28312 | 12/1994 | WIPO | 418/171 |

OTHER PUBLICATIONS

"Rotary Piston Machines" Felix Wankel Published: London Iliffe Books, 1965 p. 12 and Model Sheet 11.

*Primary Examiner*—Michael Koczo

[57] ABSTRACT

A rotary engine having an outer rotor on outer rotor bearings and an inner rotor within the outer rotor mounted on inner rotor bearings, the outer rotor axis being offset relative to the inner rotor axis, a housing enclosing the inner and outer rotors, generally radial arms formed on the inner rotor, and recesses defined between them, inwardly projecting lobes defined by the outer rotor, spaced apart, and defining outer rotor chambers, the inner rotor arms extending into the outer rotor chambers, at least around a portion of the rotational path of the rotors, a fresh air intake port for inducting fresh air into the outer rotor chambers in sequence at a predetermined point in the rotational path of the outer rotor, a fuel/air intake port for inducting burning fuel/air into the outer rotor chambers in sequence at a second predetermined point, and an exhaust port for exhausting gases from the outer rotor chambers in sequence at a third predetermined point. The invention also relates to a method of converting fuel energy into rotary force by a rotary engine.

16 Claims, 8 Drawing Sheets

ROTARY ENGINE AND METHOD OF OPERATION

TECHNICAL FIELD

The invention relates to rotary engines having an inner and outer rotor co-rotating together and a pre-combustion chamber in which fuel is continuously burning. The invention also relates to a method of converting fuel energy into rotary force by a rotary engine.

BACKGROUND ART

Internal combustion engines using reciprocating pistons have numerous disadvantages which are too well known to trouble repeating. They are heavy, of complex construction, use many moving parts, subject to relatively rapid wear, and utilize fuel at a very poor rate of efficiency.

For many years proposals have been put forward for rotary designs of internal combustion engines. The best known such rotary engine is of course the epitrochoidal engine developed by Felix Wankel. However, that design is not truly rotary.

There is disclosed in French patent 672,398 a rotary piston pump, having an inner and an outer rotor which co-rotate together. This pump is of generally similar design to those known in the art since at least 1916 (Lind) and simply comprises an inlet port for admitting fresh air and an outlet port for exit of compressed air.

There is disclosed in French patent 2,177,388 what is described as a "ante-chamber" for use on a rotary piston engine. The ante-chamber functions both as an inlet, and an exhaust opening.

DISCLOSURE OF THE INVENTION

The invention, briefly, comprises a rotary engine for the conversion of fuel energy into a rotary force and comprising, an outer rotor mounted on outer rotor bearing means for rotation about an outer rotor axis, an inner rotor within said outer rotor mounted on inner rotor bearing means for rotation about an inner rotor axis, said outer rotor axis being offset relative to said inner rotor axis, housing means enclosing said inner and outer rotors, generally radial arms formed on said inner rotor, and recess means defined between said arms, inwardly projecting lobes defined by said outer rotor, spaced apart from one another, and defining outer rotor chambers therebetween, said inner rotor arms extending into said outer rotor chambers, at least around a portion of the rotational path of said rotors, fresh air intake port means for inducting fresh air into said outer rotor chambers in sequence at a predetermined point in the rotational path of said outer rotor, fuel intake port means for inducting a burning fuel/air mixture into said outer rotor chambers in sequence at a second predetermined point around the rotational path of said outer rotor, exhaust port means for exhausting gases from said outer rotor chambers in sequence at a third predetermined point around the rotational path of said outer rotor, and, means for igniting said fuel, whereby combustion of said fuel with said air in said outer rotor chambers, develops rotational force on said rotors.

Further advantageous features of the invention are lobes defined by leading and trailing sides, and head portions defined on said lobes having leading and trailing sides and having a generally rounded shape along their leading sides and a generally pointed shape along their trailing sides, and a precombustion chamber means located exteriorly of said outer rotor.

The invention also discloses a method of converting fuel energy into rotary force by a rotary engine. The method comprises the steps of inducting fresh air into said outer rotor chambers through a fresh air intake port means in sequence at a first predetermined point in the rotational path of said outer rotor, inducting burning fuel-rich fuel/air mixture into said outer rotor chambers containing said fresh air through fuel intake port means in sequence at a second predetermined point around the rotational path of said outer rotor, and discharging exhausted gases from said outer rotor chambers through an exhaust port means in sequence at a third predetermined point around the rotational path of said outer rotor.

MODES OF CARRYING OUT THE INVENTION

Figure 1:
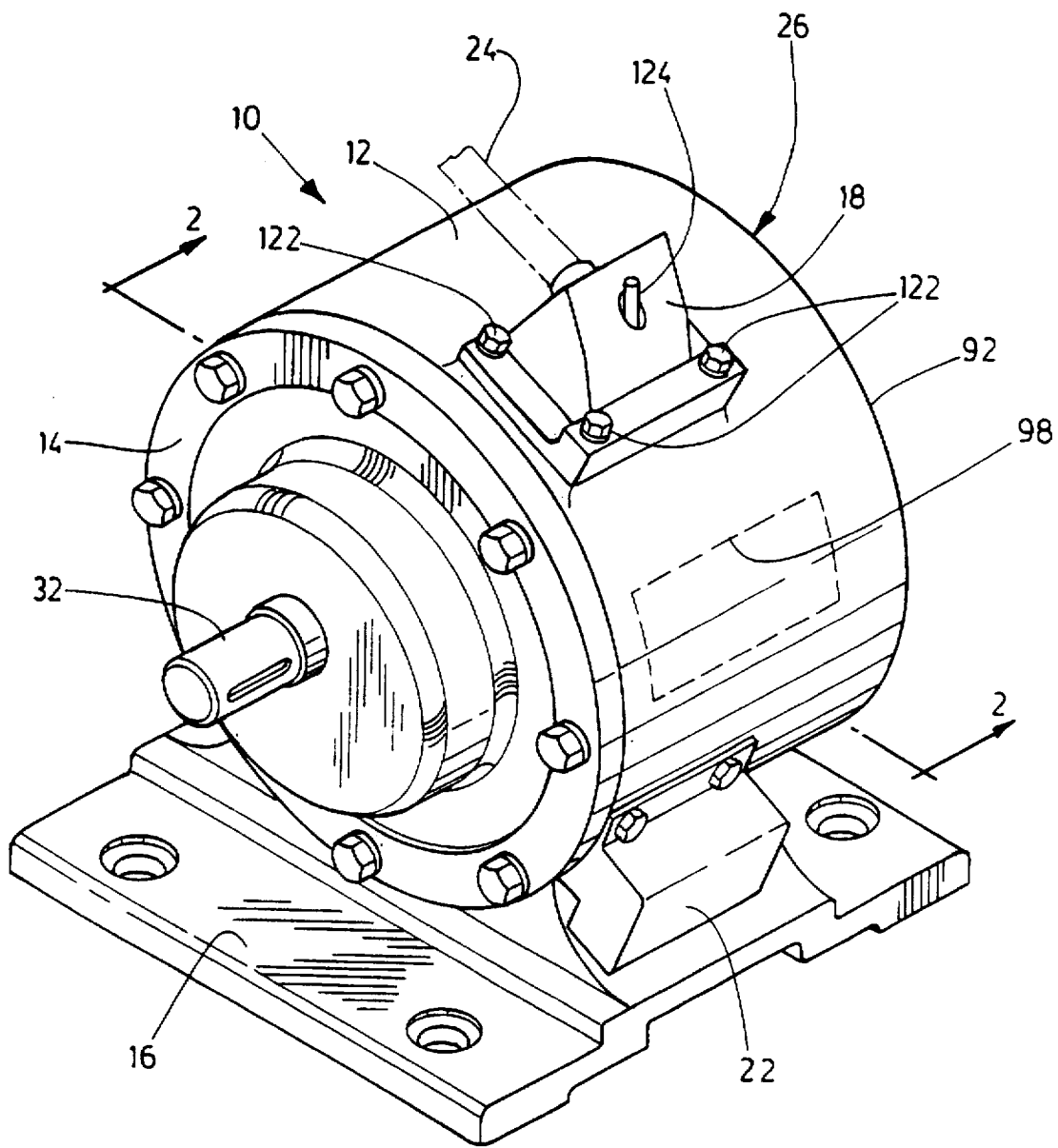
FIG. 1 is a perspective illustration of a rotary engine illustrating an embodiment of the invention.

FIG. 1 shows a rotary engine 10 having a housing 12, a closure plate 14, and a base 16.

The engine has a pre-combustion chamber 18, and an exhaust pipe 22. A rich fuel/air mixture is supplied via conduit 24 to the pre-combustion chamber 18. Fresh air is inducted via an inlet 26 (FIG. 3), and an internal opening (described below), and exhaust gases are discharged via exhaust pipe 22.

Figure 2:
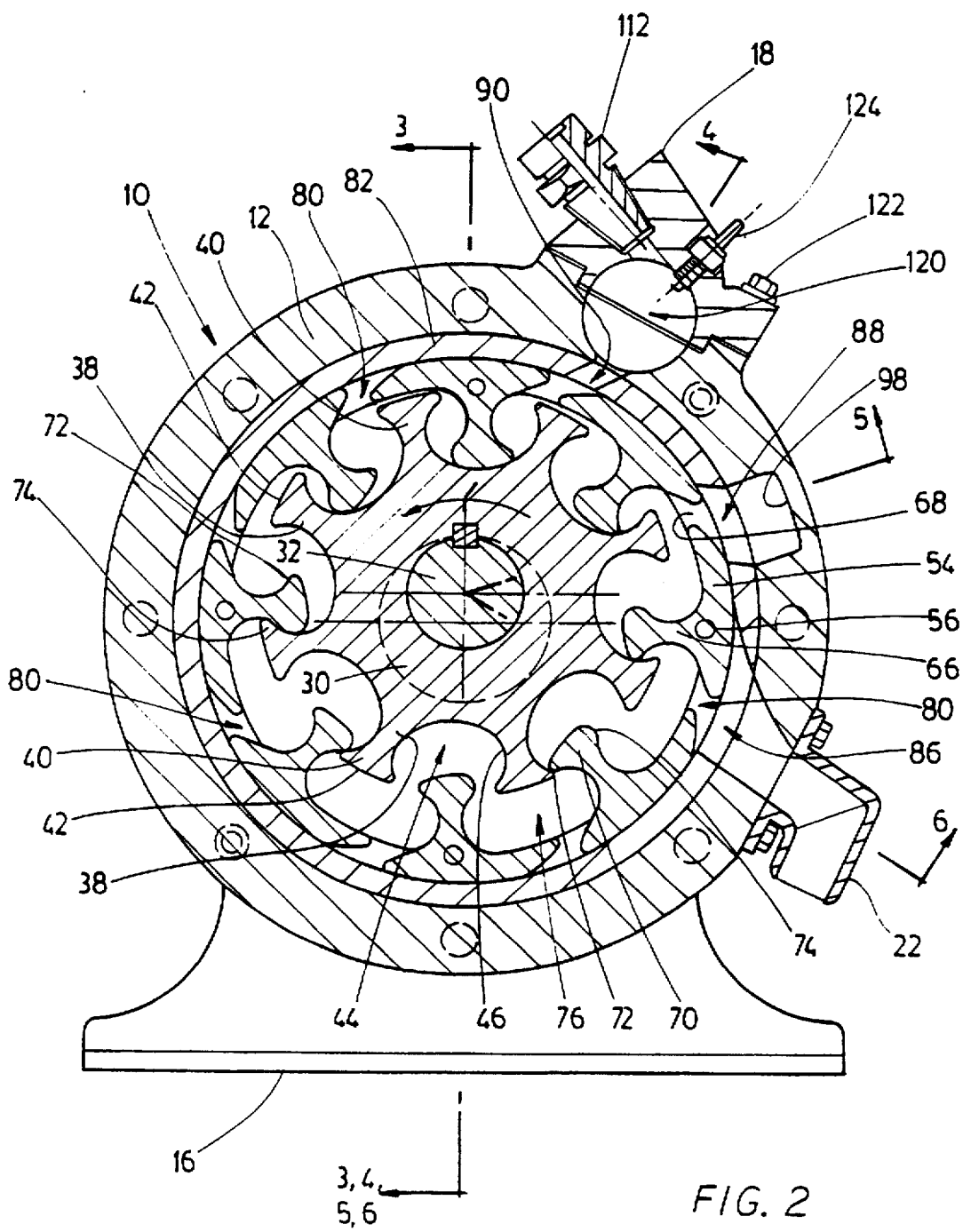
FIG. 2 is a section along the line 2—2 of FIG. 1.
Figure 3:
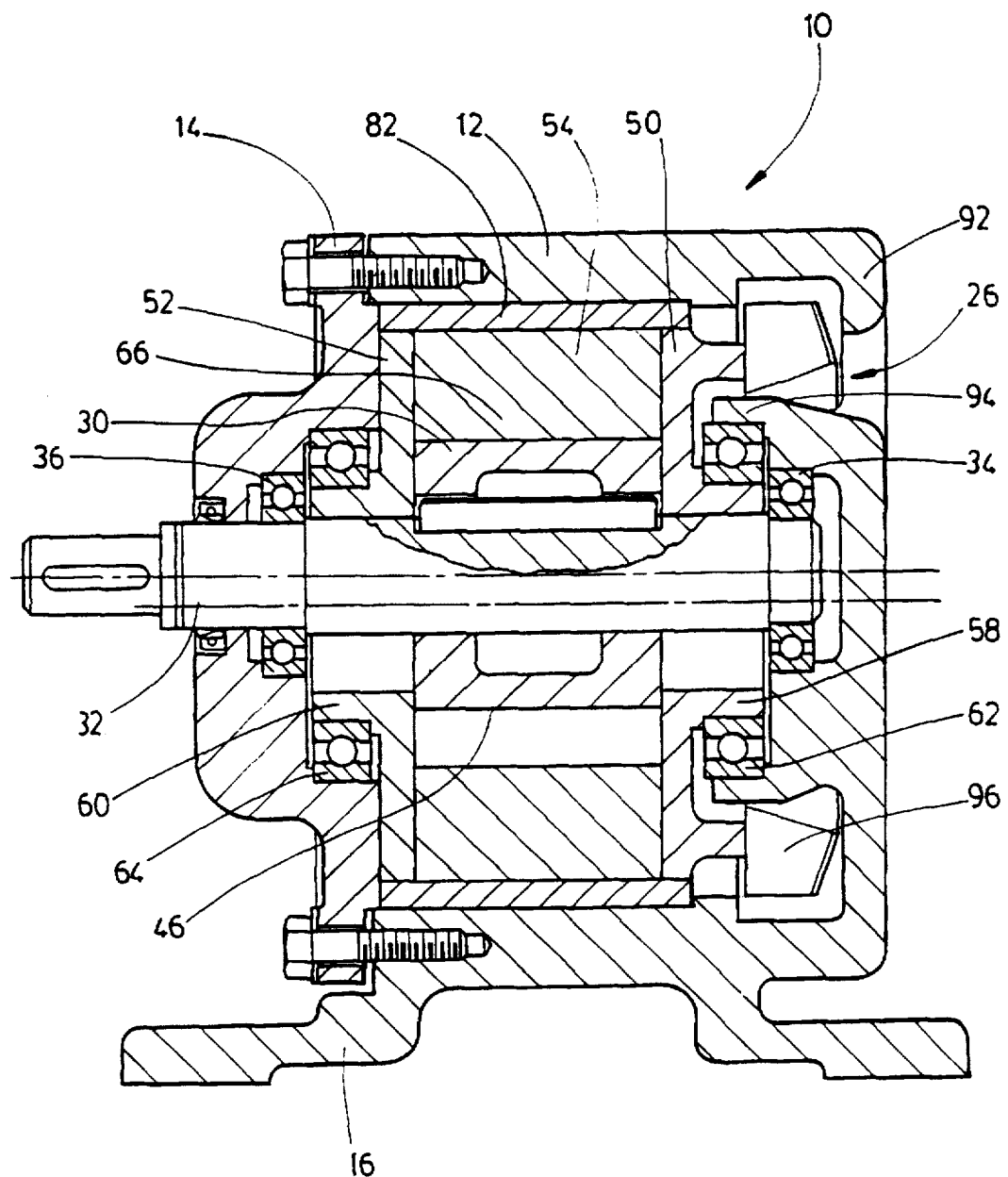
FIG. 3 is a section along the line 3—3 of FIG. 2.
Figure 4:
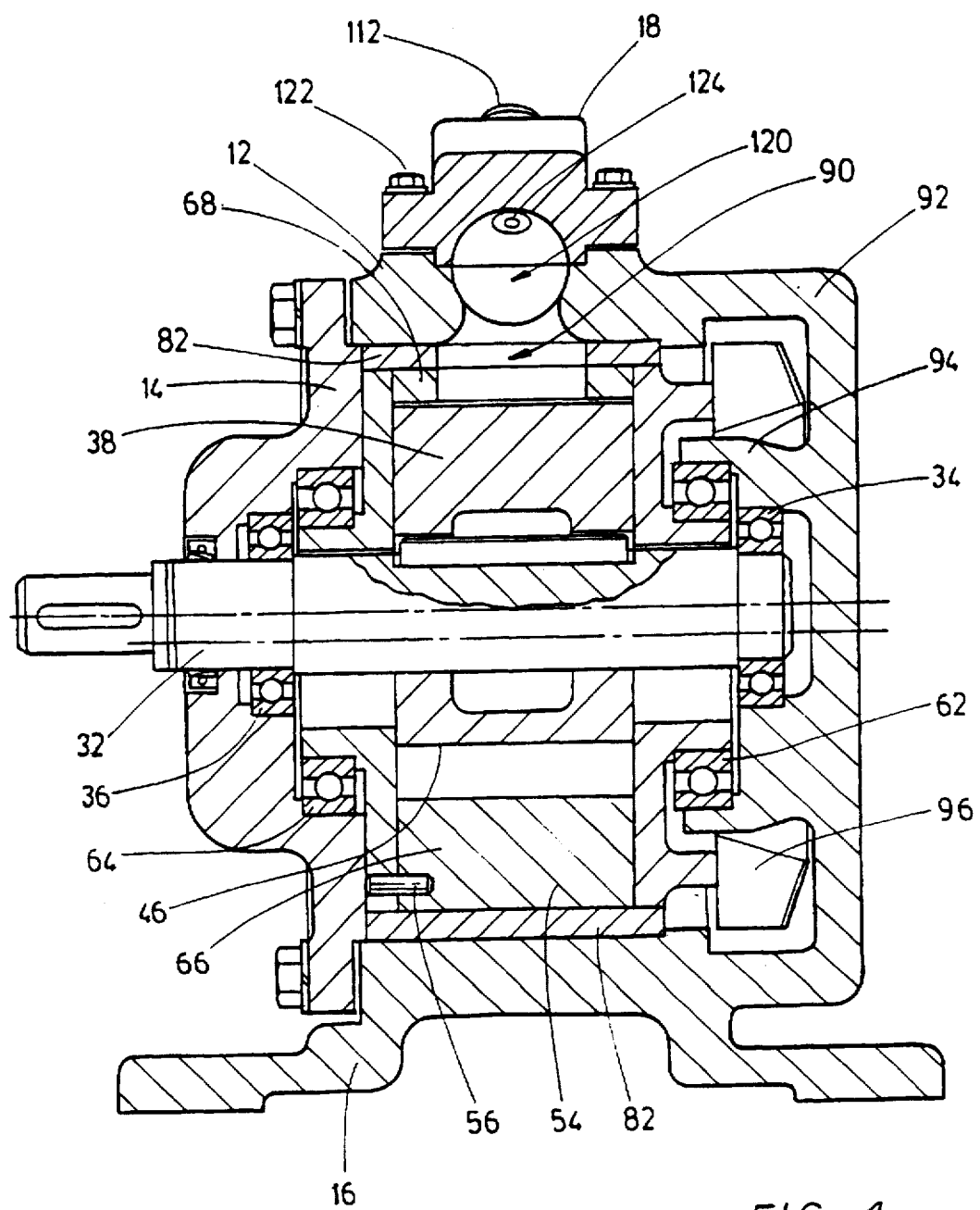
FIG. 4 is a section along the line 4—4 of FIG. 2.

FIGS. 2 and 3 show an inner rotor body 30 mounted on a shaft 32. The shaft 32 is located along the central axis of the inner rotor body 30. The shaft 32 is mounted for rotation in bearings 34–36 (FIG. 3) located respectively in housing 12 and closure plate 14, and defines the inner rotor axis of rotation. The inner rotor is slightly asymmetrical along any given radius for reasons described below, but is fully balanced about its axis.

The inner rotor in this embodiment, comprises a solid inner body and a plurality of arms 38. At the outer end of each of the arms 38 there is a head 40. The heads 40 are of slightly asymmetrical shape relative to their radial axes from the axis of rotation of the inner body 30. Heads 40 define in section, a progressively widening generally Tee-shape having an arcuate outer surface 42. Between the Tee-shaped heads 40, and their respective arms, there are formed a plurality of recesses 44 which are asymmetrical and define smooth curved arcuate contact surfaces 46, for reasons to be described below.

The outer rotor comprises, in this embodiment, first and second rotor side plates 50 and 52 (FIG. 3), and, sandwiched between them, integral an outer rotor body 54, secured by pins 56 (FIG. 2). The first and second plates, in this embodiment are provided with integral bearing sleeves 58 and 60, received in respective bearings 62 and 64, which are in turn mounted in housing 12 and closure 14 respectively. These bearings define the outer rotor axis of rotation, offset from the inner rotor axis of rotation. The outer rotor body 54 is formed with a plurality, in this case eight, inwardly projecting lobes 66, all formed integrally, at spaced intervals, around an integral outer ring portion 68.

The lobes 66 terminate at their inward ends, with respective contact bodies 70. Contact bodies 70 are generally pear-shaped in section, and define a tip 72 at a trailing end, and a convex arcuate end portion 74 at a leading end. The axis of each contact body 70, extending from its tip 72 to its rounded end 74, is turned more or less at 90° to the axis of its respective lobe 66.

Between each adjacent pair of lobes 66, the outer rotor body 54 defines respective chambers 76.

The contact bodies 70 and lobes 66 of the outer rotor body 54 are received in respective recesses 44 in the inner rotor 30.

The outer and inner rotors co-rotate together in unison. However, since the axis of rotation of the outer rotor is offset from the axis of rotation of the inner rotor, the volumes defined by the respective chambers 76 in the outer rotor, and the recesses 44 of the inner rotor vary from a minimum volume at what may be called "top dead center", at the upper position of the two rotors as illustrated, to a maximum volume at what may be called "bottom dead center", at the bottom position of the two rotors as illustrated (FIG. 2).

The two rotors rotate anti-clockwise with reference to FIG. 2. During the first portion of rotation from top to bottom positions, the rounded leading end 74 of each contact body 70, brushes around the curved surface 46 of its respective recess 44 in the inner rotor. From a point just before "bottom dead center" to just after "bottom dead center" each contact body 70 is out of contact with the surface 46 of its respective recess 44. For the remainder of the rotation from just past "bottom dead center" to "top dead center" the tip trailing end portion 72 of each contact body 70 contacts the surface 46 of its respective recess 44.

Eight flow ports 80 are formed in the ring portion 68 of the outer rotor, communicating with respective outer rotor chambers 76.

The ring portion 68 of the outer rotor is in turn received in a fixed bearing ring 82, made of a wear resistant material. The ring 82 is provided with three ports, namely, an exhaust port 86, a fresh air inlet port 88, and a fuel/air mixture inlet port 90 communicating with respective openings in the housing 12.

As already explained, exhaust combustion products are carried away along exhaust pipe 22 referred to above.

The fresh air, which is inducted through air intake opening 26 (FIG. 3) is subjected to a modest degree of pre-compression prior to its introduction into the chambers 76 of the outer rotor. This pre-compression could of course be achieved in a variety of ways, such as by some exterior device (not shown), somewhat in the manner of an engine supercharger. However, in the present embodiment, the pre-compression is achieved integrally within the housing 12. For this purpose, the housing 12 is formed with a pre-compression chamber 92. An annular wall 94 is formed integrally with housing 12. It will be noted that within the interior of the annular wall 94, the two bearings 34 and 62 are supported (on offset centers) for carrying the inner and outer rotors respectively.

The pre-compression chamber 92 in the housing 12 communicates with fresh air intake opening 26.

Figure 5:
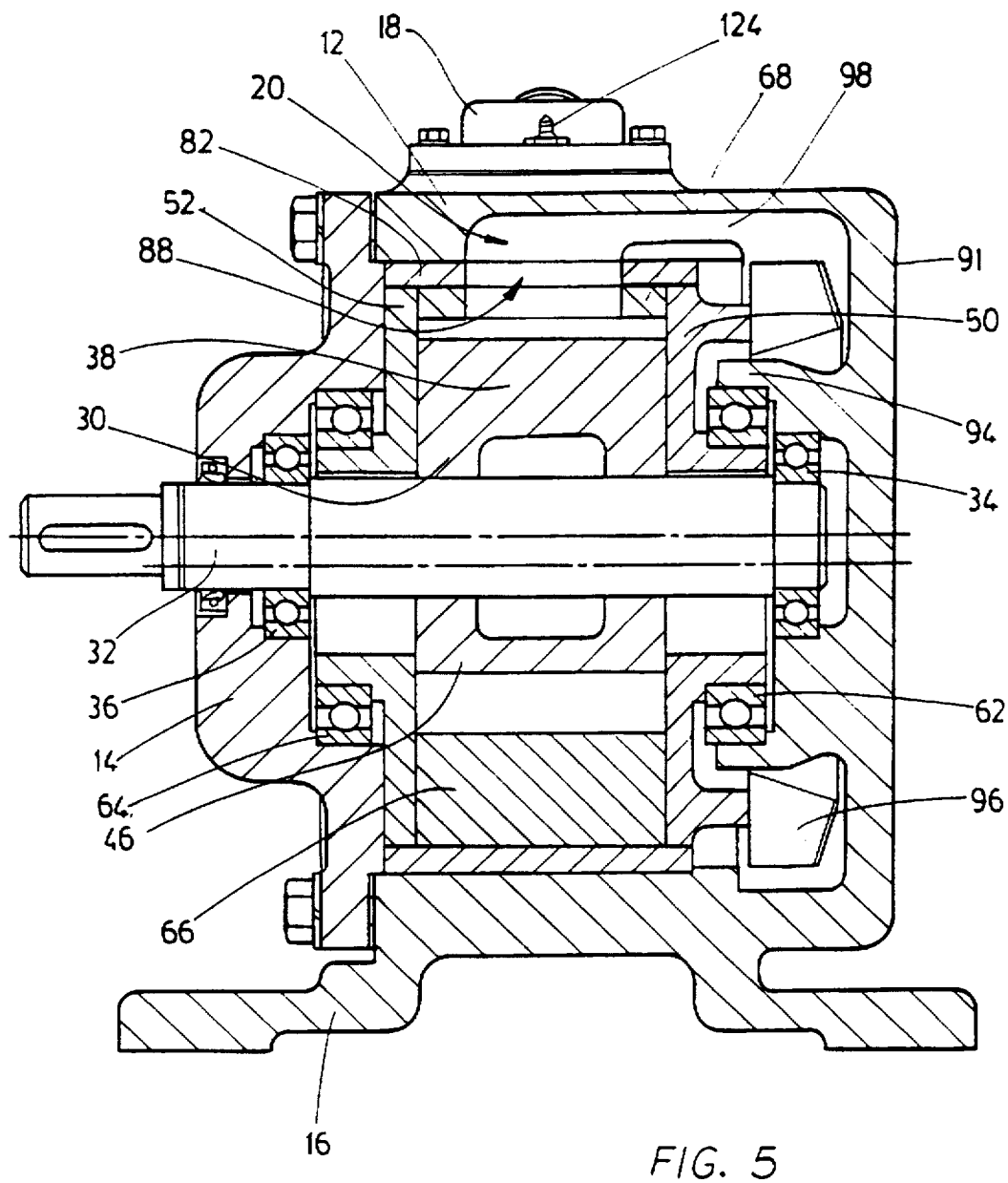
FIG. 5 is a section along the line 5—5 of FIG. 2.
Figure 6:
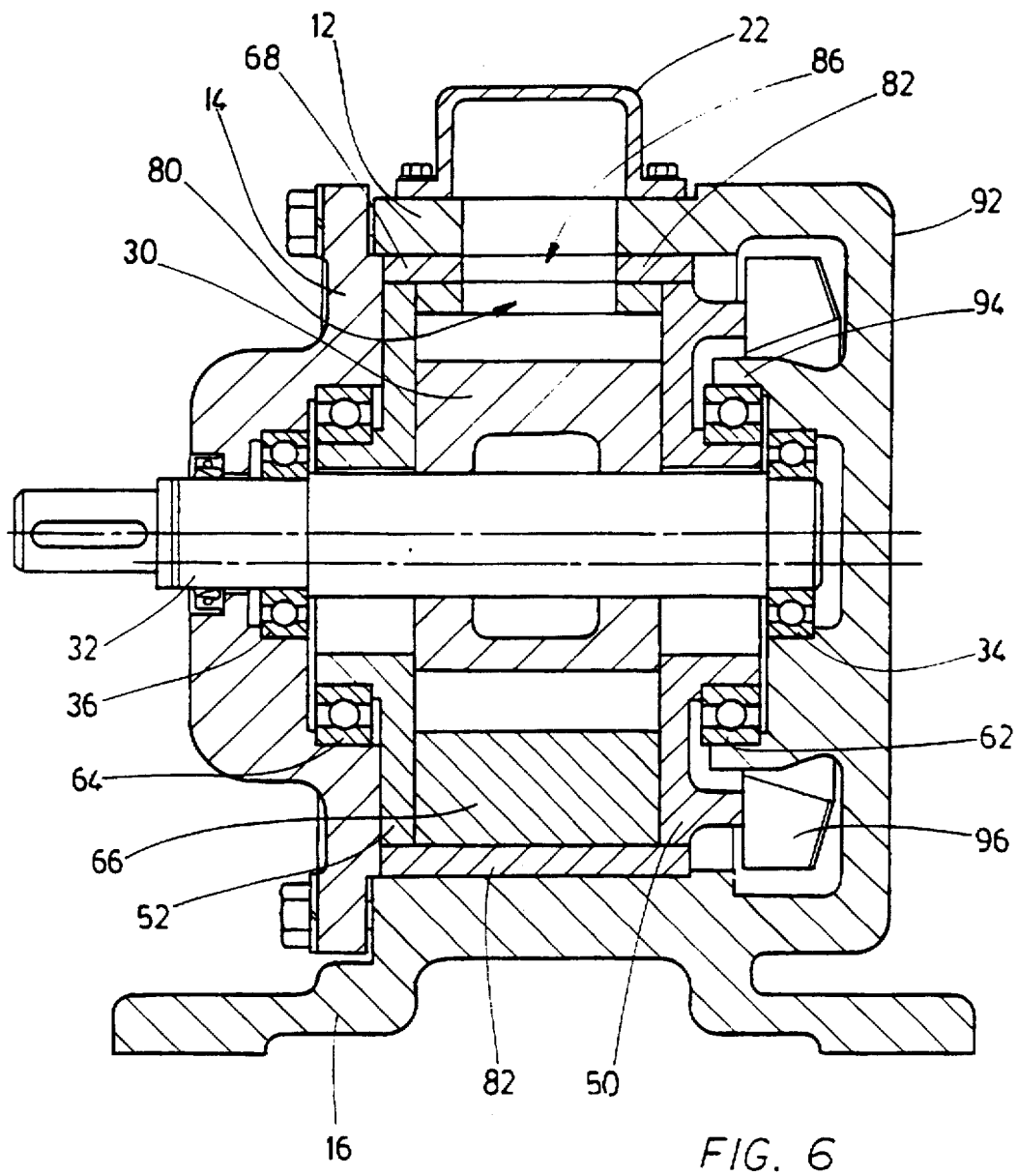
FIG. 6 is a section along the line 6—6 of FIG. 2.

Within the pre-compression chamber 92, a plurality of impeller blades or vanes 96, are mounted on the side plate 50 of the outer rotor 48. Thus as the outer rotor rotates, the impeller blades 96 also rotate and draw fresh air in through the air intake opening 26. As best shown in FIG. 5, the fresh air is then expelled at a modest elevated pressure from the pre-compression chamber 92 through the fresh air transfer duct 98. The fresh air transfer duct 98 communicates with the inlet 20 and fresh air inlet port 88 in ring 82 (FIG. 2).

Thus as each chamber 76 of the outer rotor, and the respective port 80, transits over the air inlet port 88, fresh air will be forced in under an elevated pressure thereby substantially filling each chamber 76 and its associated recess 44.

The system for supply and pre-combustion of the fuel will best be understood with reference to the FIGS. 1, 2, 4 and 7.

Figure 7:
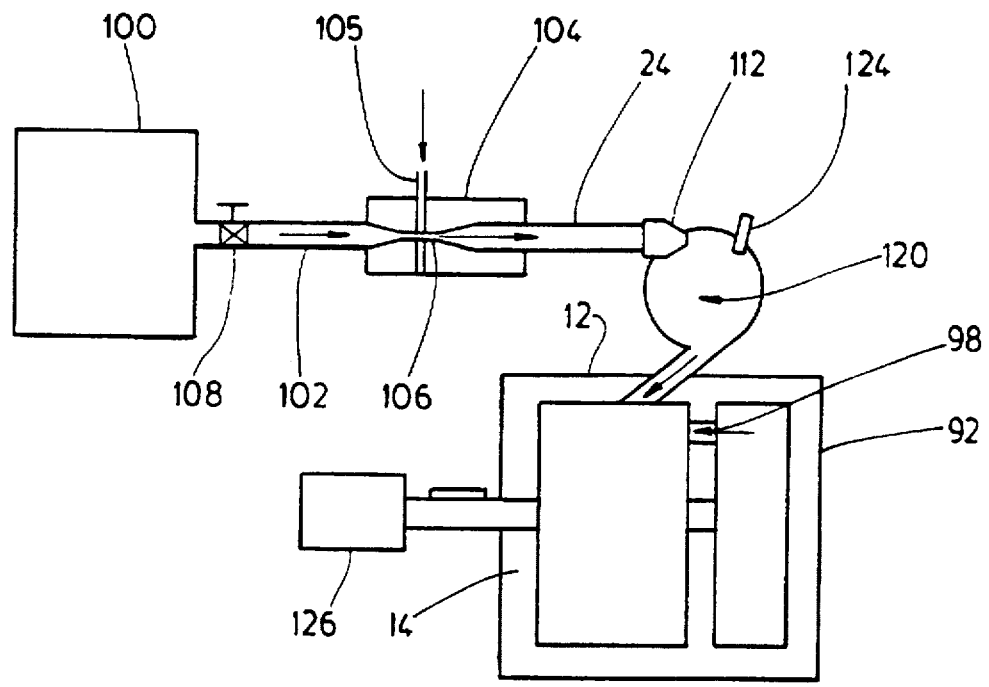
FIG. 7 is a schematic block diagram of the illustrated embodiment of the invention shown in conjunction with one exemplary form of fuel source.

In this particular embodiment of the invention, the fuel is a combustible gas, typically being propane, or natural gas, but other combustible gases would also be suitable. It will be of course be appreciated that the invention is also applicable to combustible liquid fuels, with certain modifications, which will be generally described below. Assuming the fuel is a combustible gas, then gas will be supplied from a source of compressed gas at an elevated pressure. In FIG. 7 such a compressed gas source is illustrated schematically as container 100. It will of course be appreciated that it might simply be a cylinder of compressed gaseous fuel, or might be for example a connection to a supply of natural gas under pressure from a main pipeline or the like, there being no limitation on the fuel supply or method of supply, as described above. Such compressed gas is supplied along conduit 102 to an air mixing chamber 104. A fresh air inlet 105 connects with air mixing chamber 104. The air mixing chamber 104 in this embodiment incorporates a venturi 106. The pressurized gas passes axially through the narrow waist of the venturi 106. Fresh air is inducted into the air mixing chamber 104 from one side, or through a plurality of side openings spaced apart around the venturi 106. A suitable valve 108 may supply the gas in various volumes, and a further valve (not shown) may control the supply of air.

Nozzle 112 supplies the fuel/air mixture via conduit 24 from the mixing chamber 104 to a pre-combustion chamber 120, which in this case, is located on the exterior of the housing 12. The pre-combustion chamber 120 in this embodiment, for reasons of simplicity, is of spherical shape and is formed in two halves, the one half being cast as part of the housing 12, and other half being formed separately, and being secured by suitable bolts or fastenings 122.

Also, within the pre-combustion chamber 120 there is located a fuel igniter 124, which may typically be in the form of some type of electrical spark device, or for example, may be a catalytic device or any other suitable means for starting combustion of the fuel/air mixture supplied to the pre-combustion chamber. Thereafter combustion is continuous within the chamber.

These are the principle components of the rotary engine 10 in this embodiment of the invention. It will, however, be appreciated that there may be various additions or modifications thereto, such as are known to persons skilled in the art of internal combustion engines.

For example, as illustrated schematically in FIG. 8, it will be appreciated that the fuel may be supplied through an injector directly into the combustion chamber, as described below.

Some form of starter device would also be required, typically being an electrical motor 126 powered by a battery to commence rotation of the engine. Such motor 126, schematically illustrated in FIG. 7, is in wide use in the art.

A silencer would normally be required on the exhaust pipe, and filters might be required both on the exhaust pipe and on the air intake, all as are well known in the art.

Depending upon the size and power output required, and the location of its use, some form of auxiliary cooling might be required.

STATEMENT OF OPERATION

In operation, the rotary engine is best described when operating in its steady state condition. Both the inner rotor 30 and the outer rotor 54 rotate continuously in the same direction at the same speed, about their respective axes defined by their respective bearings. Referring to FIG. 2, rotation as already explained is deemed to be taking place in the anticlockwise direction, with top dead center being at the top of the rotors as illustrated, and bottom dead center at the bottom of the rotors as illustrated.

For reasons of simplicity it is preferable to commence at the location of the exhaust port 86, which is some 20–30 degrees after bottom dead center in the anti-clockwise direction in FIG. 2.

The two rotors are spinning together in unison, at a rotational speed for example, of between 5,000 and 10,000 revolutions per minute or in some cases more. Each chamber of the outer rotor and of course the corresponding recess of the inner rotor just prior to reaching the exhaust port 86 will be full of spent fuel gases. These gases will still be at a relatively high pressure and a large portion of them will escape through the exhaust port primarily because of this pressure. Scavenging of the chamber will be further enhanced by fresh air entering, and also by the centrifugal forces resulting from the rotation. These three effects combined will force spent gases out of the chamber and discharge them through the exhaust port.

As the inner and outer rotors continue to rotate, the chamber 76 which has just been scavenged, and its port 80, will then begin to register with fresh air inlet port 88 in fixed ring 82. Air can then flow in momentarily, permitting the remaining spent fuel gases to flow out, as explained in more detail below.

The air, at fresh air inlet port 88 has previously been pre-compressed in pre-compression chamber 92, and is therefore at a modest elevated pressure. The fresh air is thus forced through the port 88 and the registering port 80 into the outer rotor chamber 76.

As the inner and outer rotors continue to rotate, the chamber 76 which has just been charged with fresh air and which has been further compressed will then register with fuel/air mixture port 90, communicating with the precombustion chamber 120.

A burning mixture of fuel and air, rich in fuel, enters the precombustion chamber. The average pressure inside the precombustion chamber is typically about 60 psia. The burning mixture is fuel-rich i.e. it has a relatively higher fuel/air ratio than the stoichiometric ratio so that incomplete combustion takes place in the precombustion chamber. As each chamber 76 registers with the fuel intake port burning fuel-rich mixture flows into one of the chambers 76. The thrust of these flowing burning gases exerts a moment or torque on the outer rotor which in turn exerts a moment or torque on the inner rotor and shaft. The shape of the rotors is designed to maximize the momentum transfer. The fresh air in the chamber 76, is at a lower pressure than the precombustion chamber fuel/air pressure. When the rich burning mixture from the precombustion chamber enters chamber 76, it mixes with the fresh air in the chamber 76 and forms a mixture leaner than the stoichiometric mixture. The process is a stratified charge combustion process. As the rotors turn anticlockwise (FIG. 2) the fuel/air mixture in each chamber continues to burn and expand to do more expansion work on the rotors. This continues until the burned mixture exhausts through the exhaust port. This process is repeated in every chamber, for every rotation.

Engine speed is controlled by the mass charge admitted to the precombustion chamber.

It will be appreciated that as the rotation of the inner and outer rotors is continuous, there are in fact eight power pulses (one for each chamber) per revolution of the inner and outer rotors. This compares favourably with other types of so-called rotary engine such as the epitrochoidal type of engine.

Referring once again to FIG. 2, the outer rotor ports 80 between the separate lobes 66, will be seen to define a predetermined first arcuate length.

The exhaust port 86 and the fresh air intake port 88 will be seen to be separated by a second predetermined second arcuate length.

In accordance with a particular feature of the invention, the second arcuate length is less than the first arcuate length. This permits the outer rotor port 80 to simultaneously overlap and register partially, both with the exhaust port 86 and the fresh air intake port 88.

By this means, the exhaust gases being exhausted from a chamber 76, through port 86 can be at least partially scavenged by the precompressed incoming fresh air from the fresh air intake port 88.

This function, which occurs at a point of relatively low pressure in the chamber 76, allows scavenging of the residual exhaust gases from the chamber and materially assists in the overall efficiency of the engine.

Typical pressure ranges for the fresh air supply, and the fuel/air supply, and in the pre-combustion chamber are as follows:

Fresh air supply to rotors between 20 psia and 30 psia.

Fuel/air mixture in pre-combustion chamber from 60 psia to 70 psia.

Pressure of fuel gas in the fuel supply line to the pre-combustion chamber from 140 psia to 160 psia.

Pressure of fresh air supply for injection to pre-combustion chamber 65 psia to 80 psia.

It will be appreciated that the fresh air within an outer rotor chamber 76 will be compressed further as the two rotors transit from the fresh air intake port 88 to the fuel intake port 90. The pressure of the burning fuel/air mixture in the pre-combustion chamber 92 is adjusted to be greater than the pressure of the compressed fresh air within the outer rotor chamber 76 when the port connects the two, causing the fuel/air mixture to flow into the chamber 76.

Figure 8:
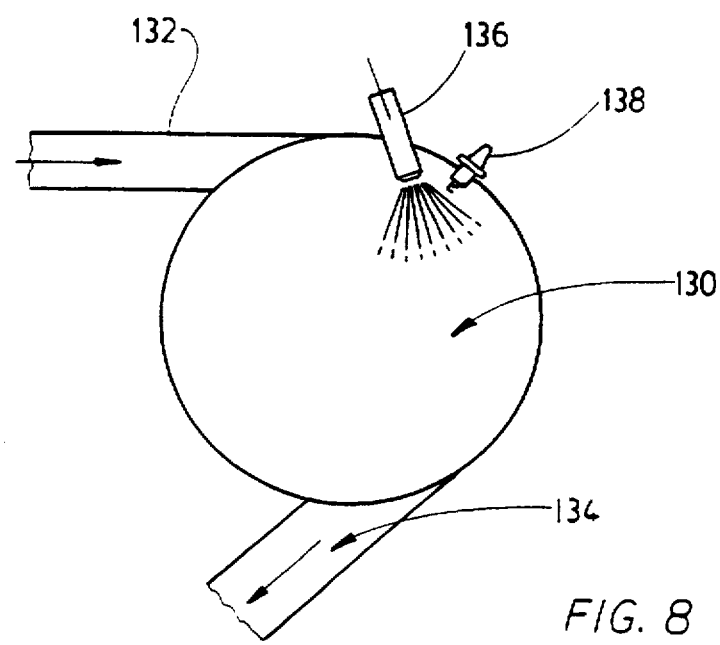
FIG. 8 is a schematic block diagram of the illustrated embodiment of the invention shown in conjunction with another exemplary form of fuel source, and, FIG. 9 is a sectional illustration showing another form of rotary engine with two complete rotor housings and two pair sets of inner and outer rotors.

A modified precombustion chamber 130 is shown in FIG. 8. It is supplied with fresh air from an air pump (not shown), by a conduit 132. Burning mixture would be supplied to the engine rotor chambers by a conduit 134. Conduit 134 and the chamber 130 will be formed integrally with the outer casing of the engine as already illustrated in FIGS. 1 through 6.

A fuel injector nozzle 136 is adapted to receive pressurized fuel (either gas or liquid) from a source (not shown) and, in the case of liquid fuel, operates to substantially atomize the fuel as it is injected into the chamber 130 in a swirling pattern. An ignition device such as a spark plug 138 will initially ignite the fuel/air mixture within the chamber 130, and thereafter combustion will be substantially continuous so long as fuel and air continues to be supplied. As before, the air supplied to the pre-combustion chamber will be sufficient to support only partial combustion of the fuel.

In both embodiments of the invention, the speed of the engine is controlled simply by controlling the mass charge to the pre-combustion chamber.

Figure 9:
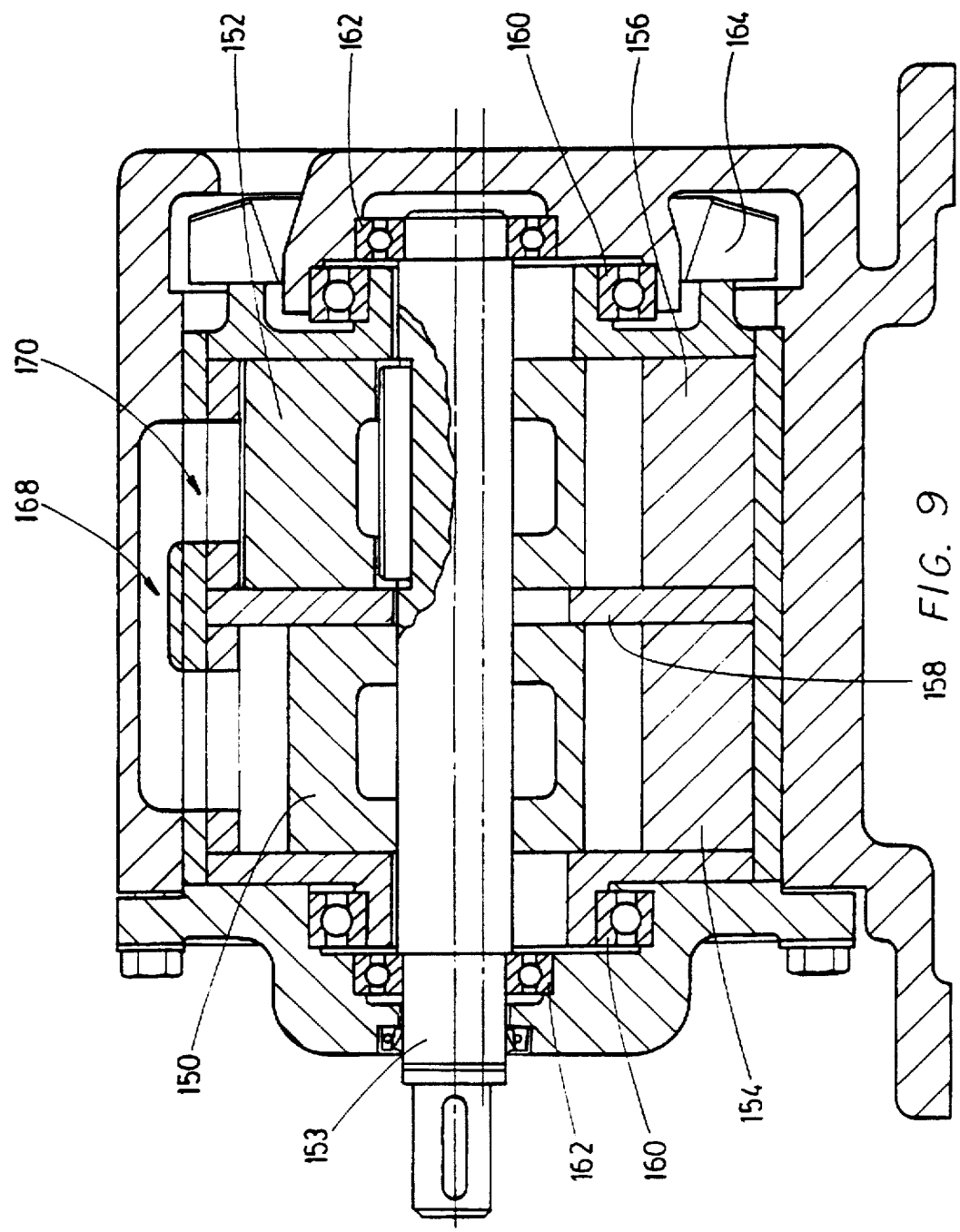

A further embodiment of the invention is illustrated in FIG. 9. In this case there are two complete sets of inner and outer rotors arranged side-by-side so as to enable the burning fuel to perform further working the second set of rotors.

For this purpose, there are two inner rotors 150 and 152 mounted on a common shaft 153, and there are two outer rotors 154 and 156, joined by a common intermediate wall 158, and mounted in bearings 160. Shaft 153 is mounted in bearings 162. A vane compressor 164 is provided for a precompressing the fresh air intake, in the manner described in connection with FIGS. 1 to 6.

A precombustion chamber is provided (not shown) similar to chamber 92 for supplying rich fuel/air mixture to rotors 150 and 154.

A transfer passage 168 is provided for transferring the burning expanded fuel/air mixture, exhausted from the rotors 150 and 154, to fuel intake 170 of rotors 152 and 156.

The exhaust port for rotors 152, 156 is not specifically illustrated in this Figure but will be generally similar to that shown in the embodiment of FIGS. 1 through 6, but at another rotational position since rotors 152, 156 are themselves in a different rotational position compared to rotors 150, 154.

It will this be seen that the combustion products exhausted from chambers defined by rotors 150 and 154 will be transferred through passageway 168, to intake 170, of rotors 152, 156, and will continue to expand and do useful work on reaching rotors 152 and 156.

Rotors 152, 156 will not require a fresh air intake port. The rotors 152, 156 will be positioned in rotational positions different from rotors 150, 154. This will enable the exhaust from rotors 150, 154 to be transferred to the top dead center position of rotors 152, 156 at the intake port 170.

The foregoing is a description of a preferred embodiment of the invention which is given here by way of example only. The invention is not to be taken as limited to any of the specific features as described, but comprehends all such variations thereof as come within the scope of the appended claims.

We claim:

1. A rotary engine (10) for the conversion of fuel energy into a rotary force and having an outer rotor (50,52,54) mounted on outer rotor bearing means (62,64) for rotation about an outer rotor axis; an inner rotor (30) within said outer rotor mounted on inner rotor bearing means (34,36) for rotation about an inner rotor axis, said outer rotor axis being offset relative to said inner rotor axis, said inner and outer rotors being rotatable in unison about said respective axes around predetermined paths; rotor housing means (12,14) enclosing said inner and outer rotors; generally radial inner rotor arms (38) formed on said inner rotor (30), and recess means (44) defined between said arms; inwardly projecting lobes (66) defined by said outer rotor, spaced apart from one another, and defining outer rotor chambers (76) therebetween, said inner rotor arms (38) extending into said outer rotor chambers (76), at least around a portion of the rotational path of said rotors, and being characterised by;

fresh air intake port means (88) for inducting fresh air into said outer rotor chambers (76) and being located at a first predetermined point around the rotational path of said outer rotor;

fuel intake port means (90) for inducting fuel rich burning fuel/air mixture into said outer rotor chambers (76) and being located at a second predetermined point around the rotational path of said outer rotor and spaced angularly from said fresh air intake port, and exhaust port means (86) for exhausting gases from said outer rotor chambers (76) and being located at a third predetermined point around the rotational path of said outer rotor and spaced angularly from said fresh air intake and said fuel intake port means.

2. A rotary engine as claimed in claim 1 and including precombustion chamber means (120) located exteriorly of said outer rotor, and communicating with said fuel intake port means (90), and means (124) for igniting said fuel/air mixture being located in said precombustion chamber.

3. A rotary engine as claimed in claim 1 wherein said lobes (66) define leading and trailing sides, and head portions (70) on said lobes having leading and trailing sides and having a generally rounded shape (74) along their leading sides and a generally pointed shape (72) along their trailing sides.

4. A rotary engine as claimed in claim 3 wherein said outer rotor chambers (76) are asymmetric about radii of said outer rotor, said trailing sides of said lobes (66) being adapted to contact respective said arm members (40) of said inner rotor.

5. A rotary engine as claimed in claim 1 wherein said fresh air intake port means (88) is located between said fuel/air intake port means (90) and said exhaust port means (86), and including pressure means (96) for supplying fresh air to said fresh air intake port means.

6. A rotary engine as claimed in claim 1 and including air supply housing means (92), and shaft means (32) from one of said inner and outer rotors extending into said air supply housing means (92), and air vane means (96) mounted on said shaft means (32) within said air supply housing means (92), and air intake means (26) for inducting air into said air supply housing means (92) upon operation of said air vane means (96), and air passageway means (98) for communicating air from said air supply housing means to said fresh air intake means of said outer rotor.

7. A rotary engine as claimed in claim 1 wherein said inner rotor arms (40) define heads (42) on the end of said arms, and wherein a said arm and said head are asymmetric about a radius dividing the same, and wherein said inner rotor recess means (44) defined between said arms are asymmetric, and define a leading portion and a trailing portion, and wherein said leading portion has a greater volume and said trailing portion has a lesser volume.

8. A rotary engine as claimed in claim 3 wherein said outer rotor lobes (66) and head portions (70) are generally asymmetric about a radius bisecting the same, and wherein said outer rotor chambers (76) defined between said lobes (66) are generally asymmetric and define leading and trailing portions and wherein said leading portions have a greater volume and said trailing portions a lesser volume.

9. A rotary engine as claimed in claim 1 wherein said outer rotor defines flow ports (80) of a predetermined arcuate length, said flow ports being adapted to register successively with said fresh air intake port means (88), said fuel intake port means (90), and said exhaust port means (86), for successively receiving intake of fresh air, intake of fuel/air mixture, and for exhausting burnt gases therefrom.

10. A rotary engine as claimed in claim 9 wherein said exhaust port means (86) and said fresh air intake port means

(88) are located a predetermined arcuate distance apart from one another, and wherein said predetermined distance is somewhat less than said arcuate length of said outer rotor flow ports (80), whereby to permit scavenging of said exhaust gases from said chamber means (76) by intake of fresh air from said fresh air intake port means (88), simultaneously with exhausting of exhaust gases therefrom.

11. A method of converting fuel energy into rotary force by a rotary engine (10) having an outer rotor (50, 52, 54) and an inner rotor (30) rotatable about offset outer and inner rotor axes respectively, said inner rotor (30) being provided with radial rotor arms (38) defining recess means (44) therebetween, said outer rotor (54) being provided with inwardly projecting lobes (66) defining outer rotor chambers (76) therebetween for coupling with said inner rotor arms (38) at least around a portion of the rotational path of said rotors, said method being characterized by the steps of:

inducting fresh air into said outer rotor chambers (76) through fresh air intake port means (88), said fresh air intake port means being located at a first predetermined point in the rotational path of said outer rotor (54);

inducting burning fuel-rich fuel/air mixture into said outer rotor chambers (76) containing said fresh air through fuel intake port means (90) being located at a second predetermined point angularly spaced around the rotational path of said outer rotor (54) from said fresh air intake port means; and discharging exhausted gases from said outer rotor chambers (76) through an exhaust port means (86) being located at a third predetermined point angularly spaced around the rotational path of said outer rotor (54), from said fuel intake port means.

12. A method of converting fuel energy into rotary force as claimed in claim 11 further comprising the step of commencing rotation of said outer rotor (50, 52, 54) and said inner rotor (30) in the same direction about their respective axes by motor means (126).

13. A method of converting fuel energy into rotary force as claimed in claim 11 further comprising the step of igniting said fuel/air mixture in pre-combustion chamber means (120) located exteriorly of said outer rotor (50, 52, 54), and communicating with said fuel intake port means (90).

14. A method of converting fuel energy into rotary force as claimed in claim 11 further comprising the step of compressing said fresh air prior to introduction to said outer rotor chambers (76).

15. A method of converting fuel energy into rotary force as claimed in claim 11 further comprising the step of compressing said fresh air in said outer rotor chambers (76) between said fresh air intake port means (88) and said fuel intake port means (90).

16. A method of converting fuel energy into rotary force as claimed in claim 11 further comprising the steps of permitting said fuel-rich fuel/air mixture and said fresh air to mix and burn, and permitting said burning gases to expand as said outer and inner rotors (30, 50, 52, 54) rotate thereby applying rotational forces to said rotors.

* * * * *